Sept. 4, 1923.
G. B. TREW
1,466,773
SILT TRAP
Filed July 13, 1921
2 Sheets-Sheet 2
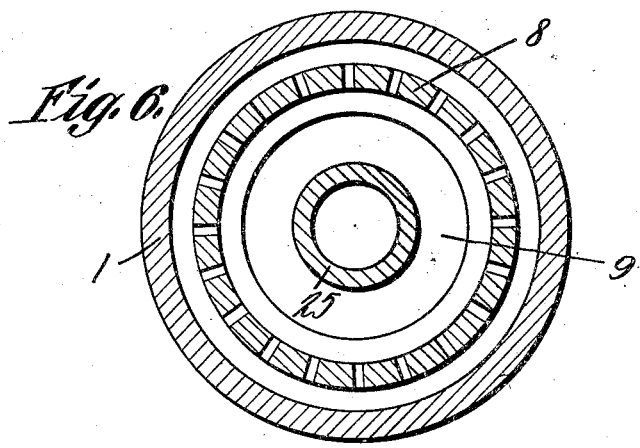
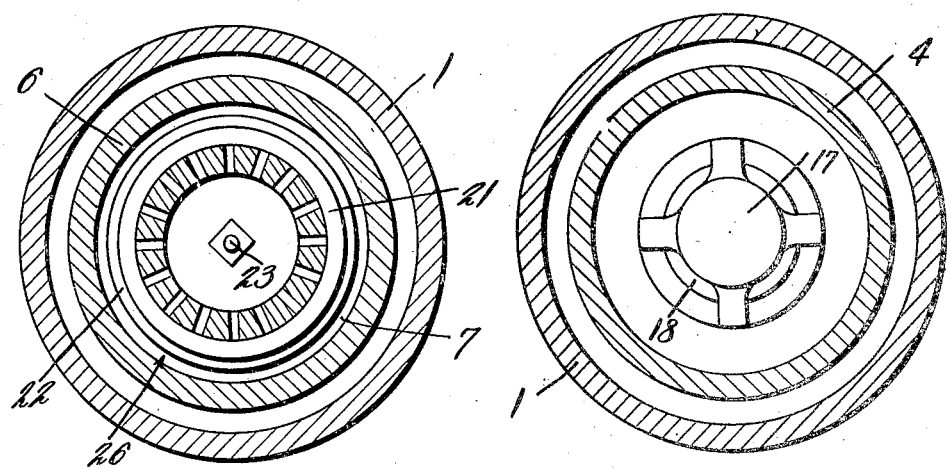
G. B. Trew,
Inventor,
By Cashow & Co.
Attorney Patented Sept. 4, 1923.

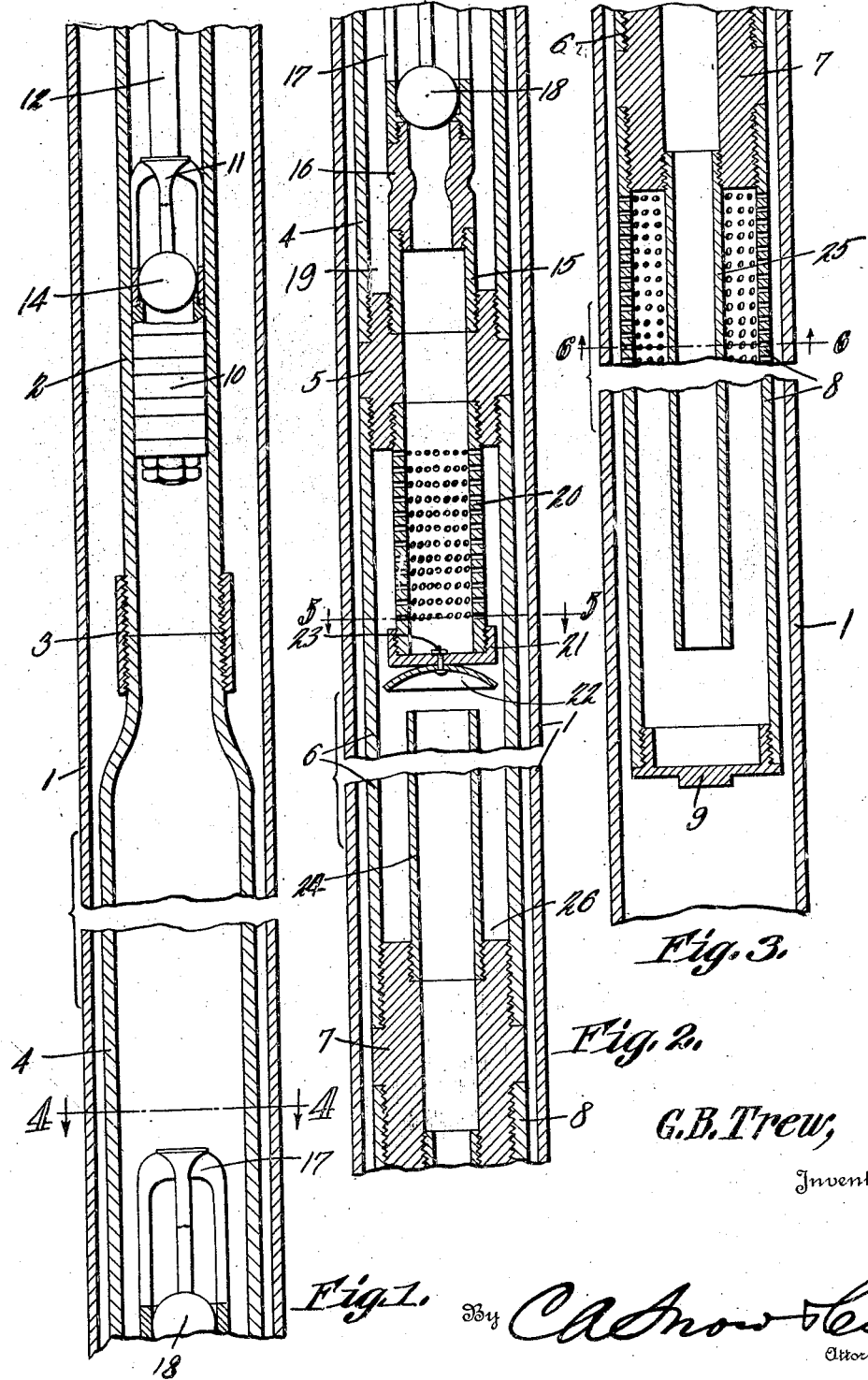

1,466,773

UNITED STATES PATENT OFFICE.

GEORGE BORNETTE TREW, OF SHREVEPORT, LOUISIANA.

SILT TRAP.

Application filed July 13, 1921. Serial No. 484,526.

*To all whom it may concern:*

Be it known that I, GEORGE B. TREW, a citizen of the United States, residing at Shreveport, in the parish of Caddo and State of Louisiana, have invented a new and useful Silt Trap, of which the following is a specification.

It is the object of this invention to provide novel means whereby silt may be trapped in a well to prevent the silt from finding its way upwardly, with the water or oil, to the injury of the piston.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in longitudinal section, the upper portion of a device constructed in accordance with the invention; Figure 2 shows in longitudinal section, the lower portion of a device constructed in accordance with the invention; Figure 3 shows in longitudinal section, the lower portion of a device constructed in accordance with the invention; Figure 4 is a cross section on the line 4—4 of Figure 1; Figure 5 is a cross section on the line 5—5 of Figure 2; Figure 6 is a cross section on the line 6—6 of Figure 3.

The numeral 1 denotes a well casing, within which is disposed a working barrel 2 connected by a collar 3 with a swaged nipple 4 united by a coupling 5 with a tube 6, the tube 6 being connected by a coupling 7 to a perforated screen 8, the lower end of which is stopped by a removable closure 9.

A piston 10 is mounted for reciprocation in the working barrel 2 and carries a cage 11 whereunto a sucker rod 12 is connected, the usual ball or other valve 14 being located in the cage 11.

The coupling 5 carries a nipple 15 connected by a coupling 16 to a cage 17 provided with a valve 18 adapted to seat on the upper end of the coupling. It is to be observed that the coupling 5 effects a closure of the space between the nipple 15 and the part 4, and, consequently, between these parts, there is fashioned an upper annular sand trap 19. A perforated screen 20 is mounted in the lower end of the coupling 5 and is provided at its lower end with a closure 21, carrying a concaved deflector 22, any suitable means 23 being provided for holding the deflector on the closure 21.

The coupling 7 carries an upstanding tube 24 and a depending tube 25, the tube 25 extending downwardly within the screen 8. The coupling 7 closes the space between the tube 24 and the member 6, to form a lower sand trap 26.

In practical operation, when the piston 10 is working, the liquid is drawn into the screen 8 through the perforations thereof, the liquid passing first downwardly, and then upwardly through the tubes 25 and 24. As the liquid is discharged, with the silt, from the tube 24, the liquid and silt are received by the deflector 22. The silt is cast downwardly and lodges in the lower trap 26, the liquid proceeding upwardly and entering the screen 20. The liquid moves upwardly, past the valve 18 and, should there be any silt left in the liquid, the increment of silt will be deposited in the trap 19, the liquid proceeding upwardly, through the swaged nipple 4, past the valve 14 and thence to the point of delivery, in the usual way.

The coupling 5 may be alluded to as an upper partition in the extension 4—5 of the working barrel 2, the coupling 7 constituting a lower partition in the extension.

I claim:—

1. In a device of the class described, a working barrel, having a depending extension which is provided at its lower end with a screen, an upper partition in the extension, a valve upstanding from the partition, a second screen depending from the partition and communicating with the valve, the partition and depending extension forming a sand trap below and about the valve, a deflector carried by the second screen, a lower partition in the extension, a depending tubular member carried by the lower partition and extended into the first specified screen, an upstanding tubular member carried by the lower partition and communicating with the depending tubular member, the upstanding tubular member discharging against the deflector, the lower partition forming a sand trap about the upstanding tubular member; and a piston mounted for reciprocation in the barrel.

2. In a device of the class described, a working barrel, having a depending extension which is provided at its lower end with a screen, an upper partition in the extension, a valve upstanding from the partition, a second screen depending from the partition and communicating with the valve, the partition and depending extension forming a sand trap below and about the valve, a lower partition in the extension, a depending tubular member carried by the lower partition and extended into the first specified screen, an upstanding tubular member carried by the lower partition and communicating with the depending tubular member, the upstanding tubular member discharging toward the second screen, the lower partition forming a sand trap about the upstanding tubular member; and a piston mounted for reciprocation in the barrel.

3. In a device of the class described, a working barrel, having a depending extension which is provided at its lower end with a screen, an upper partition in the extension, a valve upstanding from the partition, a second screen depending from the partition and communicating with the valve, the partition and depending extension forming a sand trap below and about the valve, a deflector carried by the second screen, a lower partition in the extension, an upstanding tubular member carried by the lower partition and communicating with the first specified screen, the upstanding tubular member discharging against the deflector, the lower partition forming a sand trap about the upstanding tubular member; and a piston mounted for reciprocation in the barrel.

4. In a device of the class described, a working barrel having a depending extension, an upper partition in the extension, a valve upstanding from the partition, a screen depending from the partition and communicating with the valve, the partition and depending extension forming a sand trap about and below the valve, a deflector carried by the screen, a lower partition in the extension, an upstanding tubular member carried by the lower partition, the partition having an opening communicating with the upstanding tubular member, the upstanding tubular member discharging against the deflector, the lower partition forming a sand trap about the upstanding tubular member; and a piston mounted for reciprocation in the barrel.

In testimony that I claim the foregoing as my own, I have hereto affixed my signature in the presence of two witnesses.

GEORGE BORNETTE TREW.

Witnesses:
ERNEST L. McCAIN,
L. E. STEPHENSON.